United States Patent [19]

Seidel

3,886,452

May 27, 1975

[54] LINEAR ELECTROMAGNETIC SYSTEMS

[75] Inventor: Harold Seidel, Warren, N.J.

[73] Assignee: Bell Telephone Laboratories, Incorporated, Murray Hill, N.J.

[22] Filed: Dec. 17, 1973

[21] Appl. No.: 425,164

Related U.S. Application Data

[63] Continuation-in-part of Ser. No. 885,604, Dec. 16, 1969, abandoned.

[52] U.S. Cl. .................................. 325/11; 332/37 D

[51] Int. Cl. .............................................. H04b 7/14

[58] Field of Search ........... 325/9, 11, 65, 159, 186, 325/187, 400, 401, 404, 472; 307/88.3, 300; 330/22, 40, 151, 127, 128, 149; 332/37 R, 37 D, 53, 56, 59

[56] References Cited

UNITED STATES PATENTS

| | | | |
|---|---|---|---|
| 3,170,126 | 2/1965 | Bento et al. | 332/56 |
| 3,274,518 | 9/1966 | Hoover | 332/59 X |
| 3,486,128 | 12/1969 | Lohrmann | 332/37 R |

FOREIGN PATENTS OR APPLICATIONS

| | | | |
|---|---|---|---|
| 1,118,278 | 11/1961 | Germany | 332/37 D |

*Primary Examiner*—Benedict V. Safourek
*Attorney, Agent, or Firm*—S. Sherman

[57] ABSTRACT

If all voltages operative upon any system are caused to vary proportionately, the output signal derived therefrom must also vary in the same proportion. This principle is applied to such devices as amplifiers and frequency converters as a means of significantly extending their linear dynamic operating ranges.

9 Claims, 9 Drawing Figures

LINEAR ELECTROMAGNETIC SYSTEMS

CROSS REFERENCE TO RELATED APPLICATION

This invention, which relates to linear electromagnetic wave systems, is a continuation-in-part of my co-pending application Ser. No. 885,604, filed Dec. 16, 1969 now abandoned.

BACKGROUND OF THE INVENTION

As the signal level increases in a transistor amplifier or in a varactor frequency converter, the transfer function eventually saturates. Where linear operation is required, the effect of saturation is to limit the operating range of the device about a specified quiescent operating point.

It is, accordingly, the broad object of the present invention, to increase the linear dynamic range of amplifiers and frequency converters.

SUMMARY OF THE INVENTION

The present invention is based upon the recognition that the gain of any electromagnetic system is a dimensionless ratio of two parameters, such as output and input voltages. Correspondingly, the gain function for any system is expressible as a power series of dimensionless terms composed of ratios of the applied signal voltage to the other externally applied voltages, raised to some power.

The other voltages within the system may be other externally applied direct current voltages, such as those required to maintain a specified quiescent condition, or radio frequency voltages such as are required by parametric systems. Another form of voltage may be vestigial signals remaining after a period of time within the memory of the system. Finally, other voltages can include thermal energies or activation energies within the system.

In a large class of systems, the bandwidth is sufficiently wide so that memory effects are not significant. In general, thermal or activation energies are sufficiently simple that they can readily be represented as a simple dc voltage added to the system. As such, they can be neutralized by the addition of a counter dc voltage and the system can be considered to have no net internal voltages. Under these conditions, the system is only responsive to the externally applied voltages. Thus, in accordance with the present invention, the amplitude of all such externally applied voltages are varied proportionately and, as a consequence, the output signal voltage must, of necessity, vary in the same proportion. These externally applied voltages include both dc voltages, such as bias and collector or plate voltages, and ac voltages, such as signal voltages and local oscillator voltages, if any. In all cases, the linear dynamic range of such devices as amplifiers and frequency converters can be significantly extended.

In the first application of the invention, the amplitude of the local oscillator voltage applied across a varactor frequency converter is modulated by the input signal. The effect is to vary the instantaneous operating point of the converter as a function of the instantaneous amplitude of the input signal voltage and, thereby, to minimize saturation effects normally associated with converters operating at a fixed local oscillator level.

In a second application of the invention, the amplitude of the dc bias voltage and the amplitude of the dc collector voltage of a transistor amplifier are varied in proportion to the amplitude of the input signal voltage.

It is an advantage of the invention that by increasing the useful dynamic range of converters and amplifiers, more efficient and, hence, more economic circuits can be realized.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
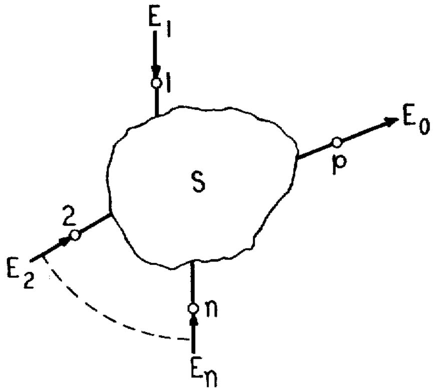
FIG. 1 shows a generalized electrical system and the various externally applied voltages operative thereon.

Referring to the drawings, FIG. 1 shows a generalized electrical system to which there are applied a plurality of n input voltages $E_1, E_2, \ldots E_n$, and from which there is extracted an output voltage $E_o$. For purposes of illustration, each of the several input voltages is shown applied to a different one of n input ports. However, as will be shown in greater detail hereinbelow, two or more signals can just as readily be applied to the same port.

The various voltages, in their most general form, can include direct current components as well as alternating current components. For example, the voltage applied to the base terminal of a transistor amplifier will, typically, comprise a direct current bias voltage as well as an alternating current input signal.

The present invention is based upon the recognition that if all the ac and dc voltages operative upon system S are caused to vary proportionately, the output voltage derived therefrom must also vary in the same proportion. Thus if $$E_1 \alpha E_2 \alpha . \ldots . E_n, \quad (1)$$

then $$E_o \alpha E_1 \alpha E_2 \alpha . \ldots . E_n. \quad (2)$$

In accordance with the teachings of the present invention, this principle is applied to frequency converters and amplifiers as a means of significantly extending their linear dynamic range and, thereby, to effect substantial economies in some common communication system circuits such as, for example, radio relay repeaters.

Figure 2:
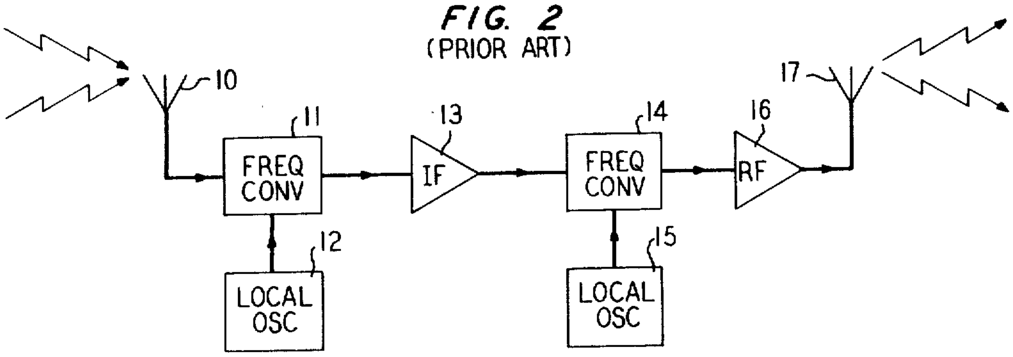
FIG. 2 (PRIOR ART)
FIG. 2 shows a prior art radio relay repeater.

FIG. 2, included for purposes of illustration, shows a typical repeater station of a radio relay network comprising: a receiving antenna 10; a frequency downconverter 11 and associated local oscillator 12; an intermediate frequency amplifier 13; a frequency upconverter 14 and associated local oscillator 15; a radio frequency amplifier 16; and a transmitting antennna 17. The operation of such a station is straightforward in that the radio frequency signal is received, down-converted to a lower frequency where it is amplified, and then up-converted to a second radio frequency for retransmission.

Advantageously, all the amplification would be achieved at the lower, intermediate frequency. However, because of the limited linear operating range of the typical frequency converter, the level of the intermediate signal applied to the up-converter is correspondingly limited. As a result, a stage of radio frequency amplification is required.

Figure 3:
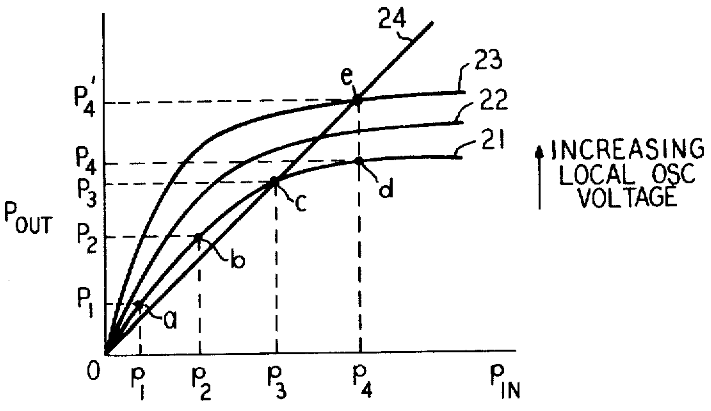
FIG. 3 shows the input-output characteristic of a typical frequency converter.

The limitation on the dynamic range of a frequency converter is illustrated in FIG. 3, which shows the input-output characteristic of a typical converter for different local oscillator signals. As can be seen, each of the curves 21, 22 and 23 is linear over a limited range and then each exhibits a region of saturation wherein increasing the input signal produces no significant increase in output. For example, operating along curve 21, an increase in input power from $p_1$ to $p_2$ causes a proportionate increase in output power from $P_1$ to $P_2$. By contrast, an equal increase in input power from $P_3$ to $P_4$ results in a significantly smaller increase in output power from $P_3$ to $P_4$. It is thus clear that where linear operation is required, up-converter 14 can only operate over the limited range $p_1$–$p_2$ and a radio frequency amplifier must then be included at the repeater station in order to raise the transmitted signal power to the required level.

The present invention is based upon the recognition that the region of linear operation can be extended if the amplitude of the local oscillator signal applied to the converter is varied in proportion to the instantaneous amplitude of the input signal. For example, while adequate linearity is achieved along curve 21 going between operating points *a* and *b*, at the higher levels, where saturation effects are at work, linear operation would be possible if the operating point were not confined to curve 21 but could be shifted to one of the other curves. Thus, if the operating point could shift from point *c* on curve 21 to point *e* on curve 23, the output power could increase from $P_3$ to $P_4'$ as the input power increased from $p_3$ to $p_4$. Under these conditions, the useful dynamic range of the converter would no longer be limited to the region between $p_1$ and $p_2$ but would extend all the way from $p_1$ to $p_4$, thereby making it possible to eliminate the radio frequency amplifier. A repeater having an extended dynamic range in accordance with the present invention is illustrated in FIG. 4A.

Figure 4A:
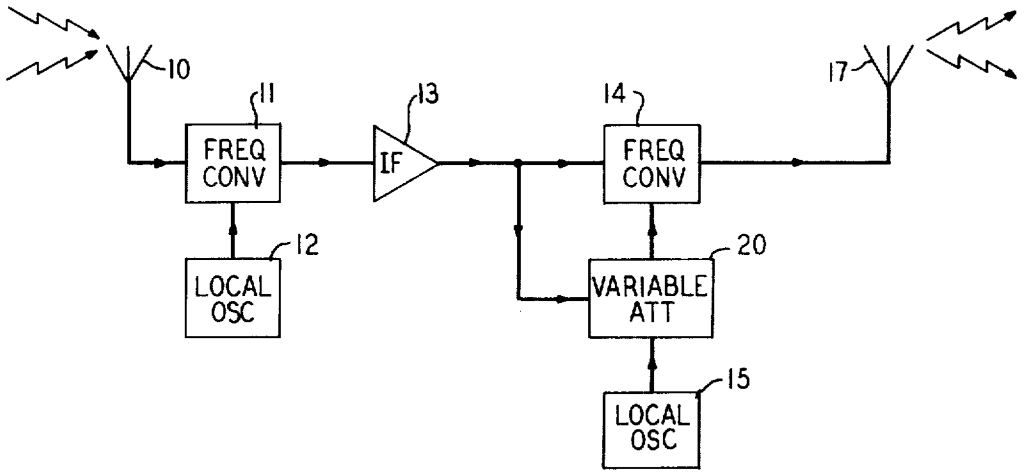
FIG. 4A shows in block diagram, a radio relay repeater modified in accordance with the present invention.

Using the same identification numerals as in FIG. 2 to identify corresponding components, the repeater of FIG. 4A comprises: a receiving antenna 10; a frequency down-converter 11 and associated local oscillator 12; an intermediate frequency amplifier 13; a frequency up-converter 14 and associated local oscillator 51; and a transmitting antenna 17. Also included in the circuit of FIG. 4A, and located between local oscillator 15 and frequency converter 14, is a variable attenuator 20 whose attenuation is controlled by the intermediate frequency signal, as will be explained in greater detail hereinbelow. Absent from the repeater of FIG. 4A is the radio frequency amplifier 16.

In the operation of a prior art frequency converter, the input signal assumes a varying range of values relative to that of the local oscillator. As a result, the loading on the local oscillator is continuously varying. For example, the Manley-Rowe relationship states that in a reactive frequency converter the ratio of the input signal power absorbed, Ps, to the frequency of the input signal power absorbed, $P_s$, to the frequency of the input signal, $\omega_s$, is equal to the same ratio $P_{lo}/\omega_{lo}$ for the local oscillator and the output signal, $P_o/\omega_o$. That is, $$\frac{P_s}{\omega_s} = \frac{P_{lo}}{\omega_{lo}} = \frac{P_o}{\omega_o}. \qquad (3)$$

It follows from this relationship that for very low input signals essentially no local oscillator power is absorbed, whereas for larger input signals, correspondingly larger amounts of local oscillator power are absorbed. Thus, the converter appears as a continuously varying load to the local oscillator. In particular, the system changes from an essentially reactive load to an essentially resistive load over the range of signal levels. This produces a change in phase as well as a change in the amplitude of the local oscillator signal applied to the converter. It is these changes that produce the nonlinear effects referred to hereinabove and which limit the dynamic operating range of prior art converters.

Thus, it is seen from power considerations that the typical frequency converter has an inherently nonlinear input-output characteristic. This might suggest that by varying the local oscillator power as a function of the input signal power, saturation effects would be eliminated. Power considerations, however, while adequate to explain the behavior of the converter, tend to obscure the actual interrelationship between cause and effect since power is an averaging over many cycles. While, this averaging process examines many events, it provides no way of identifying and specific event. Furthermore, there is a loss of time sense in that a power measurement is descriptive of past events and leaves no possible way of effecting a correction of any of these events after the fact.

A more relevant examination of the interaction of signal and local oscillator requires that they be viewed on an instantaneous basis. Thus, in accordance with the present invention, saturation effects are minimized by maintaining an instantaneously constant relationship between the amplitude of the input signal and the amplitude of the applied local oscillator. When this condition is established, the system loading on the local oscillator is more nearly constant in that the incident local oscillator power is more appropriate for the particular signal level. As a result, all of the incident power is either totally absorbed or the ratio of reflected to absorbed power is maintained more nearly constant. Under this condition, the local oscillator is either match-terminated or mismatched to a constant degree. This is achieved in accordance with one embodiment of the invention by the inclusion of attenuator 20 between the local oscillator 15 and frequency converter 14, and by causing the instantaneous attenuation of the attenuator to vary in accordance with the instantaneous amplitude of the applied signal. Thus, when the amplitude of the input signal is small, the amplitude of the local oscillator signal is correspondingly low. As the input signal level increases, the level of the local oscillator signal also increases, thereby moving the operation point from curve 21 to a point on curve 22 or curve 23, as required by the instantaneous signal level. When this condition is established, the input-output characteristic of converter 14 is given more nearly by the linear curve 24 in FIG. 3. In effect, the linear dynamic range is no longer a function of any particular local oscillator signal level, as indicated by curves 21, 22 and 23 but, instead, expands automatically in accordance with the requirements of the applied signal.

Figure 4B:
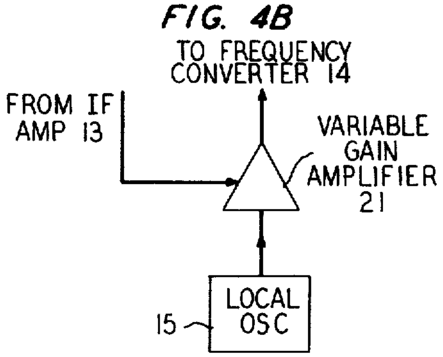
FIGS. 4B and 4C show two modifications of the local oscillator circuit of the repeater illustrated in FIG. 4A.

In the embodiment of FIG. 4A it is assumed that the level of output signal from oscillator 15 is relatively large, and is modulated by means of a variable attenuator. In an alternate arrangement, illustrated in FIG. 4B, the amplitude of the signal derived from local oscillator 15 is relatively small, in which case it is coupled to converter 14 through a variable gain amplifier 21. More specifically, the gain of amplifier 21 is made to vary in response to the instantaneous amplitude of the IF signal applied to converter 14, thus, maintaining the proportionality between the amplitudes of the two, externally applied signals.

Figure 4C:
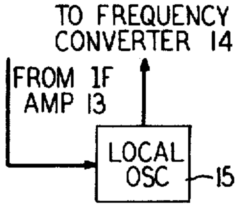

In a third embodiment of the invention, shown in FIG. 4C, the IF signal derived from amplifier 13 operates directly upon local oscillator 15 to vary the amplitude of the local oscillator signal applied to converter 14.

In all of the above-described cases, means, responsive to the instantaneous amplitude of the input signal, are provided to vary the instantaneous amplitude of the local oscillator signal.

Figure 5:
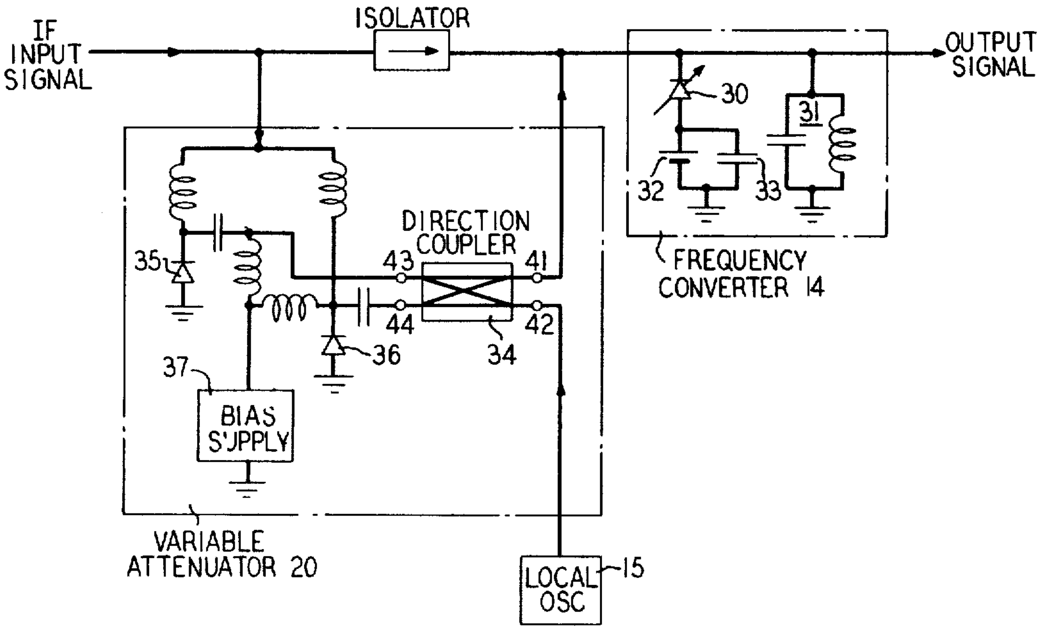
FIG. 5 shows a specific embodiment of a variable attenuator for use in connection with the present invention.

FIG. 5, include for purposes of illustration, shows, in some detail, a frequency converter and a variable attenuator of a type that can be usedd to practice the invention. The converter 14 comprises a varactor diode 30 connected in parallel with a resonant circuit 31, tuned to the output signal frequency. A direct current source 32 and a shunt-connected bypass capacitor 33 are connected in series with the varactor for reasons which will be explained in greater detail hereinbelow.

Variable attenuator 20 comprises a 3 db quadrature hybrid coupler 34 and a pair of diodes 35 and 36. The latter are connected, respectively, to one pair of conjugate ports 43 and 44 of coupler 34, and to the input signal wavepath. Local oscillator 15 is connected to one port 42 of the other pair of conjugate ports, 41 and 42. Port 41 is connected to converter 14.

Diodes 35 and 36 are biased by means of a bias supply 37 so that they appear as a match termination on coupler 34. So biased, all of the local oscillator signal is absorbed in the diodes and none reaches the converter. In the presence of an applied signal, however, the net bias on the diodes is modulated, changing the magnitudes of their impedances. Since the diodes are no longer a match for the coupler, varying amounts of the local oscillator signal are reflected by the diodes. The reflected signals recombine in port 41, from whence they are coupled to the converter. Thus, by varying the voltage applied across diodes 35 and 36 in response to the amplitude of the IF input signal, the amplitude of the local oscillator voltage coupled to varactor 30 is cause to vary proportionately.

As noted above, a direct current source 32 is included in series with varactor 30. It is known that associated with any semiconductor device are contact potentials and/or junction potentials, depending upon the nature of the device. In those cases where these potentials are significant, best results are obtained by eliminating them by the inclusion of a suitably located counter potential. In the illustrative embodiments of FIG. 5, this is done by the inclusion of a counter dc source 32 in series with varactor 30. At what point such internal potentials become significant will depend upon the particular application at hand. As a general rule, an internal potential may be considered significant if, at any time, it is greater than five percent of the useful input signal.

It will be noted that in the embodiment of the invention shown in FIG. 4A, the IF signal and the local oscillator signal are applied to two physically distinct ports of frequency converter 14. In the illustrative embodiment of FIG. 5, on the other hand, both signals are applied to a common port. In either case, the only significant fact is that the two externally applied voltages are caused to vary proportionately.

Figure 6:
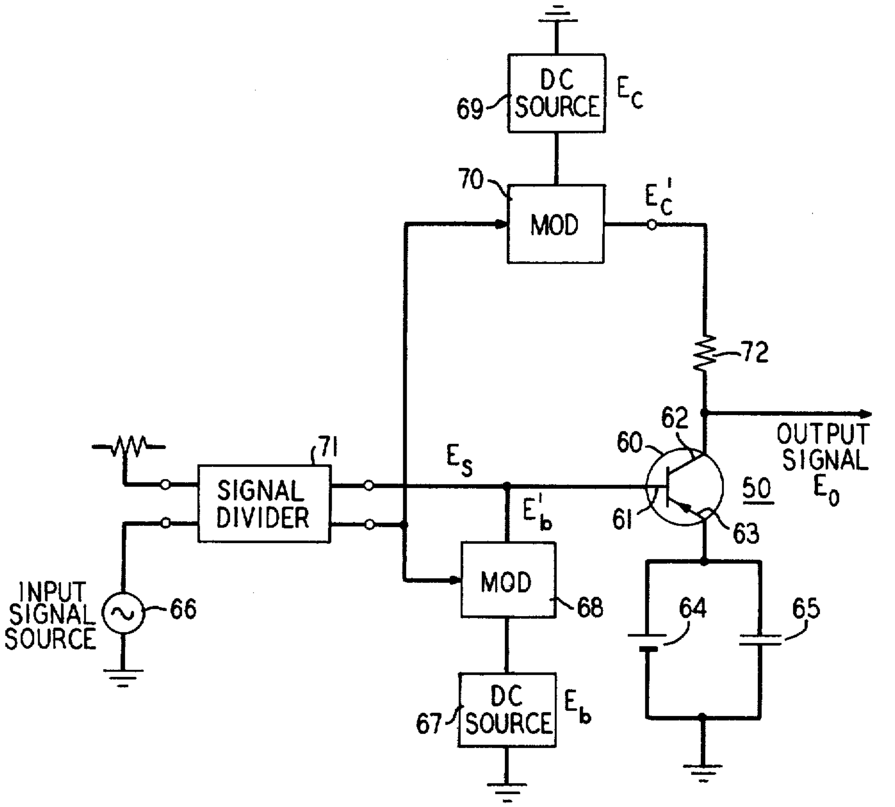
FIG. 6 shows, in block diagram an amplifier in accordance with the present invention.

The principles of the present invention can also be applied to other devices such as, for example, amplifiers. For purpose of illustration, the transistor amplifier 50 shown in FIG. 6 is considered. Basically, the amplifier comprises a transistor 60 having a base electrode 61, an emitter electrode 62 and a collector electrode 63. The emitter electrode is connected to ground through a direct current source 64 which serves to neutralize any significant contact and/or junction potentials in the emitter circuit for the reasons given above. Source 64 is bypassed by a capacitor 65.

The base electrode is connected to a direct current base bias source 67 through modulator 68, and to the input signal source through a power divider 71. The collector electrode is, in turn, connected to a direct current collector source 69 through a collector load impedance 72 and a modulator 70. A portion of the input signal is also coupled from divider 71 to modulators 68 and 70.

In operation, the externally applied dc voltages, produced by dc source 67 and 69, and modulators 68 and 70, and applied to amplifier 50, establish a specific operating point at a prescribed level of input signal. In a typical prior art amplifier the externally applied dc voltages, once established, remain the same, regardless of the instantaneous amplitude of the input signal. By contrast, in accordance with the present invention, the dv voltages are caused to vary in response to changes in the amplitude of the input signal. These variations are produced by modulators 68 and 70 which, in response to the input signal, add or subtract a component of voltage in series with dc sources 67 and 69. For example, an amplitude modulated signal is described by the function.

$$E_s = (Af(t)) \sin \Omega t \text{ TM } (4)$$

where $Af(t)$ is the amplitude term whose instantaneous value

Varies as the time function $f(t)$; and $\Omega$ is the angular frequency of the carrier signal.

Assume for purpose of illustration that the system is adjusted such that at a particular time $t_1$, the magnitude of the amplitude function $Af(t_1)$ is equal to $A_1$ and the voltages introduced by modulators 68 and 70 are zero. In this case, the instantaneous voltages $E_c'$ and $E_b'$ applied to amplifier 50 are equal to $E_c$ and $E_b$, respectively. At some later time $t_2$, the magnitude of the amplitude function $Af(t_2)$ will be equal to $A_2$ where the ratio of $A_2$ to $A_1$ is given by $$\frac{A_2}{A_1} = m \quad (5)$$

In order to maintain the requisite proportionately, each of the modulators 68 and 70 introduces a component of voltage in series with the respective dc sources 67 and 69 such that the ratio of voltage $E_b'$ to $E_b$, and the ratio of voltage $E_c'$ to $E_c$ are also equal to $m$. That is $$\frac{A_2}{A_1} = \frac{E_b'}{E_b} = \frac{E_c'}{E_c} = m. \quad (6)$$

Thus, as the magnitude of the amplitude function $Af(t)$ varies as a function of time, the instantaneous magnitudes of $E_c'$ and $E_s'$ vary correspondingly. In this manner, the instantanteous amplitude of all of the external voltages applied to amplifier 50 vary proportionately in accordance with the teachings of the present invention.

Figure 7:
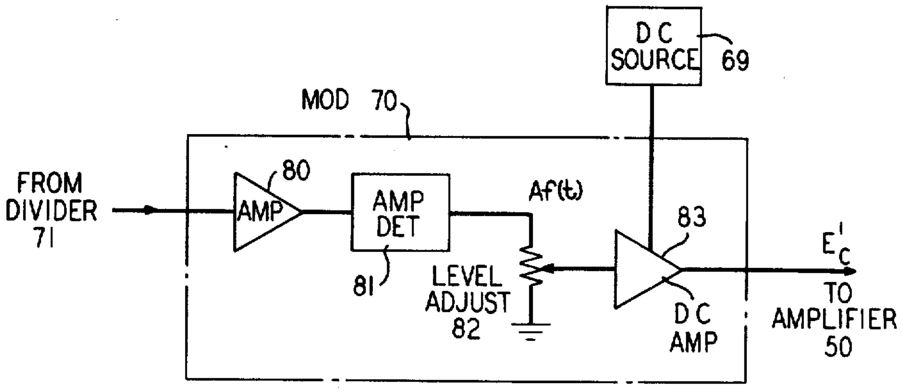
FIG. 7 shows, in greater detail, a modulator for varying the amplitude of the direct current voltage applied to the amplifier of FIG. 6.

FIG. 7, included for purposes of illustration, shows one way of varying the magnitude of the direct current voltages applied to amplifier 50. In this particular arrangement, the component of input signal derived from signal divider 71, being small, is first amplified in an amplifier 80. The amplified signal is then coupled to an amplitude detector 81 wherein the amplitude function $Af(t)$ is recovered. The latter signal is applied to amplifier 50 through a dc amplifier 83.

A level adjust potentiometer 82 between detector 81 and dc amplifier 83 provides a means for adjusting the magnitude of output voltage $E_c'$. As explained hereinabove, the modulator is adjusted to produce a particular dc voltage at some reference level of input signal. Once adjusted, the output voltage $E_c$40 will vary as a linear function of the instantaneous amplitude of the input signal $Af(t)$. A similar modulator circuit would be used to control the bias voltage $E_b'$.

SUMMARY

It is the teaching of the present invention that the linear dynamic range of any electromagnetic wave system not having significant memory effects can be extended by neutralizing all significant internal voltages and varying the instantaneous amplitude of all externally applied voltage proportionately. Specifically, the amplitude of all externally applied voltages is caused to vary in proportion to the instantaneous amplitude of the useful input signal.

Two specific applications are described. In the first application, the instantaneous amplitude of the local oscillator signal applied to a frequency converter is caused to vary in proportion of the instantaneous amplitude of the input signal. In the second application, the magnitude of each of the dc voltages applied to a transistor amplified are caused to vary in proportion to the instantaneous amplitude of the input signal.

It should be noted that the modulators employed to vary the various externally applied voltages operate at the envelope frequency and not the carrier frequency. As such, it is an advantage of the present invention that one can obtain significant improvements in the linearity of high frequency circuits by the addition of much lower frequency components to the circuit.

Though not specifically shown, it will be recognized the phase and/or time delay adjustments may be required to compensate for any time or phase differentials experienced in the modulator circuits. Thus, in all cases it is understood that the above-described arrangements are illustrative of but a small number of the many possible specific embodoments which can represent applications of the principles of the invention. Numerous and varied other arrangements can readily be devised in accordance with these principles by those skilled in the art without departing from the spirit and scope of the invention.

I claim:

1. In combination:

an electromagnetic wave system to which at least two externally applied voltages are applied, one of which is the useful input signal;

separate means associated with each of the other of said applied voltages for continuously varying the instantaneous amplitude of each of said other voltages in proportion to the instantaneous amplitude of said useful input signal;

and means for extracting an output signal from said system.

2. The combination according to claim 1 including means for neutralizing all significant internal voltages in said system.

3. The combination according to claim 1 wherein:

said system is a frequency converter;

said other applied voltages include an alternating current local oscillator voltage.

4. The combination according to claim 3 wherein said separate means includes a variable attenuator for controlling the instantaneous amplitude of the local oscillator voltage applied to said frequency converter at each instant over the entire period of operation.

5. The combination according to claim 3 wherein said separate means includes a variable gain amplifier for controlling the instantaneous amplitude of the local oscillator voltage applied to said frequency converter at each instant over the entire period of operation.

6. The combination according to claim 3 wherein said input signal and said local oscillator voltage are applied to separate terminals of said system.

7. The combination according to claim 3 wherein said input signal and said local oscillator voltage are applied to a common terminal of said system.

8. A frequency converter comprising:

a veractor diode;

means for applying an input across said diode;

means for applying a local oscillator voltage across said diode;

and means, responsive to the instantaneous amplitude of said input signal, for proportionately varying the instantaneous amplitude of said local oscillator voltage in time phase with the instantaneous amplitude variations of said input signal.

9. In combination:

an amplifier;

means for applying an input signal to said amplifier;

means for applying dc voltages to said amplifier;

means associated with each of said dc voltages for varying the instantaneous amplitude of all of said dc voltages in proportion to the instantaneous amplitude of said input signal at each instant over the period of operation;

and means for extracting an output signal from said amplifier.

* * * * *